(12) United States Patent
Li et al.

(10) Patent No.: US 11,079,497 B2
(45) Date of Patent: Aug. 3, 2021

(54) VEHICLE LOCALIZATION BASED ON NEURAL NETWORK

(71) Applicant: Continental Automotive Systems, Inc., Auburn Hills, MI (US)

(72) Inventors: Dalong Li, Rochester Hills, MI (US); Dominik Froehlich, Royal Oak, MI (US); Ibro Muharemovic, Warren, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 207 days.

(21) Appl. No.: 16/139,433

(22) Filed: Sep. 24, 2018

(65) Prior Publication Data
US 2019/0094389 A1     Mar. 28, 2019

Related U.S. Application Data

(60) Provisional application No. 62/562,841, filed on Sep. 25, 2017.

(51) Int. Cl.
| | | |
|---|---|---|
| *G01C 21/30* | (2006.01) | |
| *G01S 19/49* | (2010.01) | |
| *G08G 1/16* | (2006.01) | |
| *G08G 1/01* | (2006.01) | |
| *G08G 1/00* | (2006.01) | |

(Continued)

(52) U.S. Cl.
CPC ............ *G01S 19/49* (2013.01); *G01C 21/165* (2013.01); *G01C 21/30* (2013.01); *G01S 19/48* (2013.01);

(Continued)

(58) Field of Classification Search
CPC .................................. G01C 21/30; G01S 19/49
See application file for complete search history.

(56) References Cited

U.S. PATENT DOCUMENTS 5,548,512 A  *  8/1996  Quraishi .............. G05D 1/0255
                                                        701/23
7,202,776 B2 *  4/2007  Breed ..................... G01S 19/42
                                                        340/435
(Continued)

FOREIGN PATENT DOCUMENTS

| EP | 2402923 A | 1/2012 | |
|---|---|---|---|
| EP | 2402923 A1 * | 1/2012 | ............. G08G 1/161 |
| WO | 2008001943 A1 | 1/2008 | |

OTHER PUBLICATIONS

International Search Report and Written Opinion of the International Searching Authority dated Dec. 9, 2018 for corresponding PCT application No. PCT/US2018052633.

*Primary Examiner* — Shelley Chen

(57) ABSTRACT

A method for determining a location of a vehicle is provided. The method includes receiving, at data processing hardware, a first set of vehicle system data from one or more vehicles. The method also includes determining, at the data processing hardware, a data model based on the first set of vehicle system data. Additionally, the method includes receiving, at the data processing hardware, a second set of vehicle system data associated with the vehicle. The vehicle being different than the one or more vehicles. The method includes determining, using the data processing hardware, a vehicle location based on the second set of vehicle system data and the data model. The method includes displaying, on a user interface of the vehicle in communication with the data processing hardware, the vehicle location.

12 Claims, 5 Drawing Sheets

(51) Int. Cl.
*G01S 19/48* (2010.01)
*G01C 21/16* (2006.01)
*G06N 3/08* (2006.01)
*G07C 5/00* (2006.01)
*G01S 19/38* (2010.01)
*G01S 5/02* (2010.01)
*G01S 19/13* (2010.01)
*G01C 22/00* (2006.01)

(52) U.S. Cl.
CPC ............... *G06N 3/08* (2013.01); *G07C 5/008* (2013.01); *G08G 1/0104* (2013.01); *G08G 1/0112* (2013.01); *G08G 1/161* (2013.01); *G08G 1/22* (2013.01); *G01C 22/00* (2013.01); *G01S 5/0289* (2013.01); *G01S 19/13* (2013.01); *G01S 19/38* (2013.01)

(56) References Cited

U.S. PATENT DOCUMENTS

| | | | |
|---|---|---|---|
| 9,940,729 B1* | 4/2018 | Kwant | G06T 7/579 |
| 9,989,964 B2* | 6/2018 | Berntorp | G06N 3/049 |
| 10,282,861 B2* | 5/2019 | Kwant | G06T 7/74 |
| 10,424,079 B2* | 9/2019 | Viswanathan | G06K 9/627 |
| 10,621,495 B1* | 4/2020 | Huval | G06K 9/00791 |
| 2005/0134440 A1* | 6/2005 | Breed | G01S 17/89 340/435 |
| 2005/0278098 A1* | 12/2005 | Breed | G01S 13/931 701/45 |
| 2007/0005609 A1* | 1/2007 | Breed | B60N 2/2863 |
| 2008/0046150 A1* | 2/2008 | Breed | B60R 21/0134 701/45 |
| 2011/0301844 A1* | 12/2011 | Aono | G01S 13/931 701/300 |
| 2012/0065876 A1* | 3/2012 | Kadowaki | G08G 1/161 701/300 |
| 2012/0209519 A1* | 8/2012 | Basnayake | H04W 64/00 701/457 |
| 2017/0259801 A1* | 9/2017 | Abou-Nasr | B60W 10/20 |
| 2018/0165831 A1* | 6/2018 | Kwant | G05D 1/0251 |
| 2018/0292825 A1* | 10/2018 | Smolyanskiy | G05D 1/0246 |
| 2018/0373980 A1* | 12/2018 | Huval | G06K 9/00805 |
| 2019/0137290 A1* | 5/2019 | Levy | G01C 21/3461 |
| 2019/0248411 A1* | 8/2019 | Peng | G01S 19/45 |

* cited by examiner

400

```
┌─────────────────────────────────────────────┐
│ Receiving, At Data Processing Hardware, A   │
│ First Set Of Vehicle System Data From One   │
│ Or More Vehicles                            │
│                                         402 │
└─────────────────────────────────────────────┘
                      ↓
┌─────────────────────────────────────────────┐
│ Determining, Using The Data Processing      │
│ Hardware, A Data Model Based On The First   │
│ Set Of Vehicle System Data                  │
│                                         404 │
└─────────────────────────────────────────────┘
                      ↓
┌─────────────────────────────────────────────┐
│ Receiving, At The Data Processing Hardware, │
│ A Second Set Of Vehicle System Data         │
│ Associated With The Vehicle, The Vehicle    │
│ Being Different From The One Or More        │
│ Vehicles                                    │
│                                         406 │
└─────────────────────────────────────────────┘
                      ↓
┌─────────────────────────────────────────────┐
│ Determining, Using The Data Processing      │
│ Hardware, A Vehicle Location Based On The   │
│ Second Set Of Vehicle System Data And The   │
│ Data Model                                  │
│                                         408 │
└─────────────────────────────────────────────┘
                      ↓
┌─────────────────────────────────────────────┐
│ Displaying, On A User Interface Of The      │
│ Vehicle In Communication With The Data      │
│ Processing Hardware, The Vehicle Location   │
│                                         410 │
└─────────────────────────────────────────────┘
```

FIG. 4

VEHICLE LOCALIZATION BASED ON NEURAL NETWORK

TECHNICAL FIELD

This disclosure relates to a deep neural network trained to improve vehicle localization.

BACKGROUND

A Global Positioning System (GPS) may be used to determine the time and location of an object having a GPS receiver. The GPS includes one or more satellites orbiting the earth or stationary with respect to a position on the earth and GPS receivers associated with objects, such as vehicles. The GPS receivers communicate with the one or more satellites. The one or more satellites provide the GPS receiver with geolocation and time information associated with the GPS receiver as long as there is an unobstructed line of sight between the GPS receiver and at least one satellite. In some instances, the GPS receiver does not have a direct line of sight with one or more satellites due to weather conditions, vehicle position, or any other conditions. In this case, the GPS receiver does not receive geolocation information, thus failing to determine the location of the vehicle. In addition, the geolocation and time information associated with the GPS receiver might not have the accuracy that is needed for specific vehicle functions, for example, for use in automated driving. Therefore, it is desirable to have an improved localization system that is capable of determining the location of the vehicle regardless if the vehicle is in line of sight with one or more satellites.

SUMMARY

One aspect of the disclosure provides a method for determining a location of a vehicle. The method includes receiving, at data processing hardware, a first set of vehicle system data from one or more vehicles. The method also includes determining, using the data processing hardware, a data model based on the first set of vehicle system data. In addition, the method includes receiving, at the data processing hardware, a second set of vehicle system data associated with the vehicle. The vehicle being different from the one or more vehicles. The method also includes determining, using the data processing hardware, a vehicle location based on the second set of vehicle system data and the data model. The method includes transmitting, from the data processing hardware to a user interface of the vehicle in communication with the data processing hardware, a command to display the vehicle location.

Implementations of this aspect of the disclosure may include one or more of the following optional features. In some implementations, the data model includes weights and biases associated with the first set of vehicle system data. The data processing hardware may be supported by the vehicle. Alternatively, the data processing hardware is in communication with the vehicle by way of a shared network.

In some implementations, the data processing hardware includes a first data processing hardware supported by the vehicle and a second data processing hardware in communication with the first data processing hardware by way of a shared network. In some examples, the first and second sets of vehicle system data includes a GPS location data, vehicle dynamics, sensor data, and camera images. Additionally, the first set of vehicle system data may be associated with one or more vehicles captured during a predetermined period of time. In some examples, the second set of vehicle system data is received in real-time while the vehicle is maneuvering along a road.

In some implementations, memory hardware is in communication with the processing hardware. The memory hardware stores instructions that when executed cause the processing hardware to execute the method described.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a schematic view of an exemplary arrangement of operations for a method that determines a vehicle location.

Like reference symbols in the various drawings indicate like elements.

DETAILED DESCRIPTION

Figure 1A:
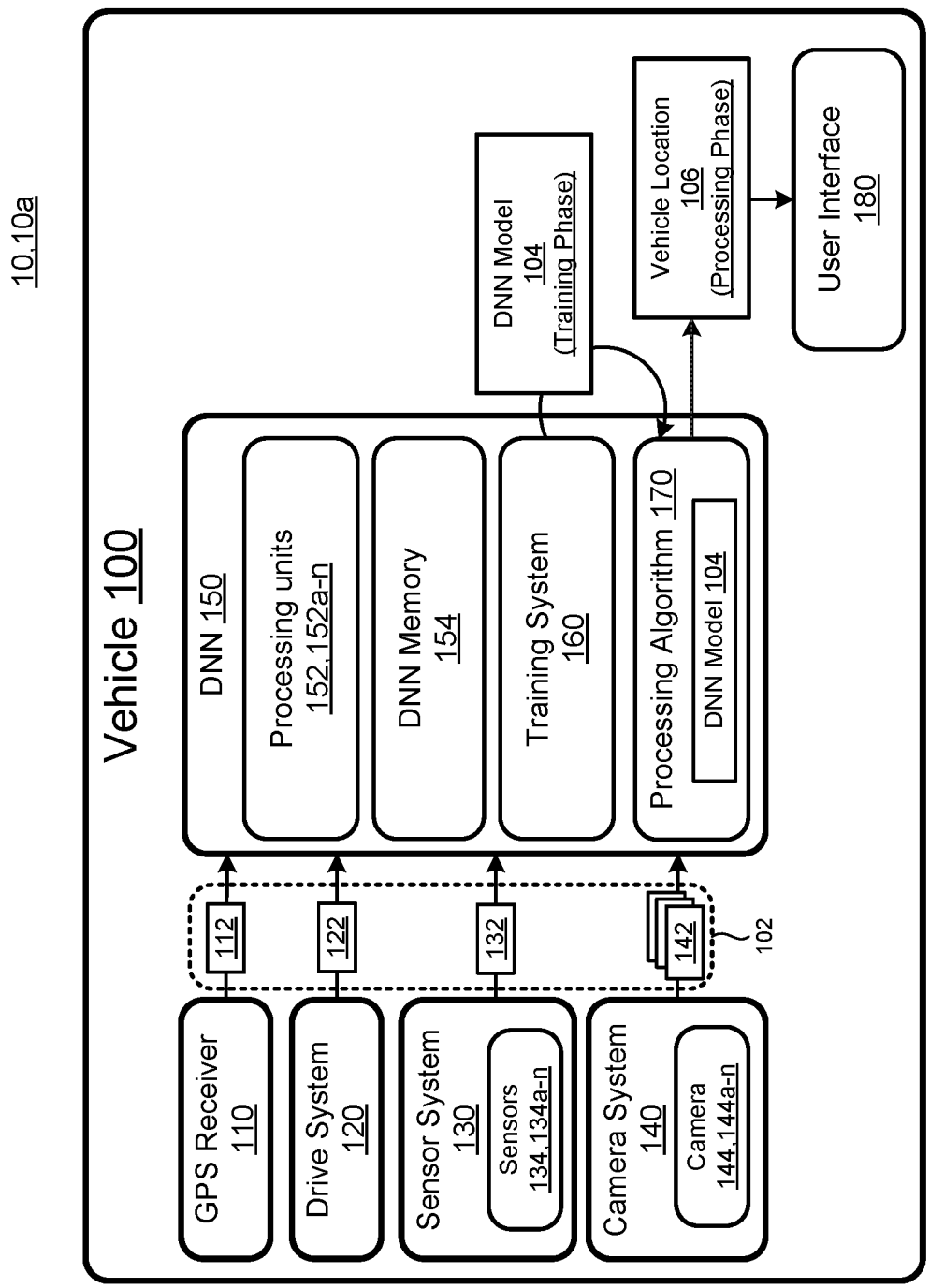
FIG. 1A is a schematic view of exemplary system for determining a vehicle location including a deep neural network supported by the vehicle.
Figure 1B:
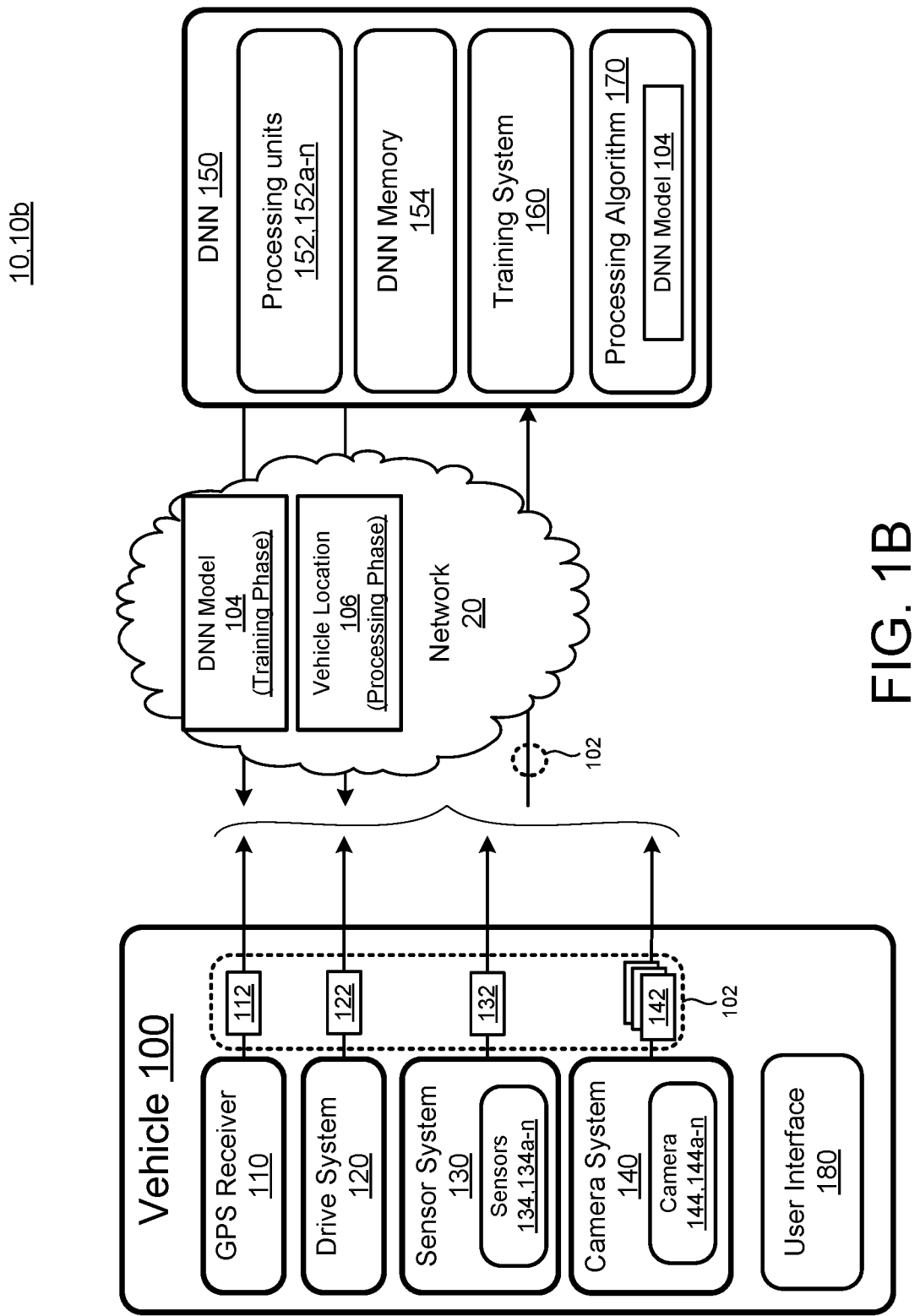
FIG. 1B is a schematic view of exemplary system for determining a vehicle location including a deep neural network in communication with the vehicle.
Figure 1C:
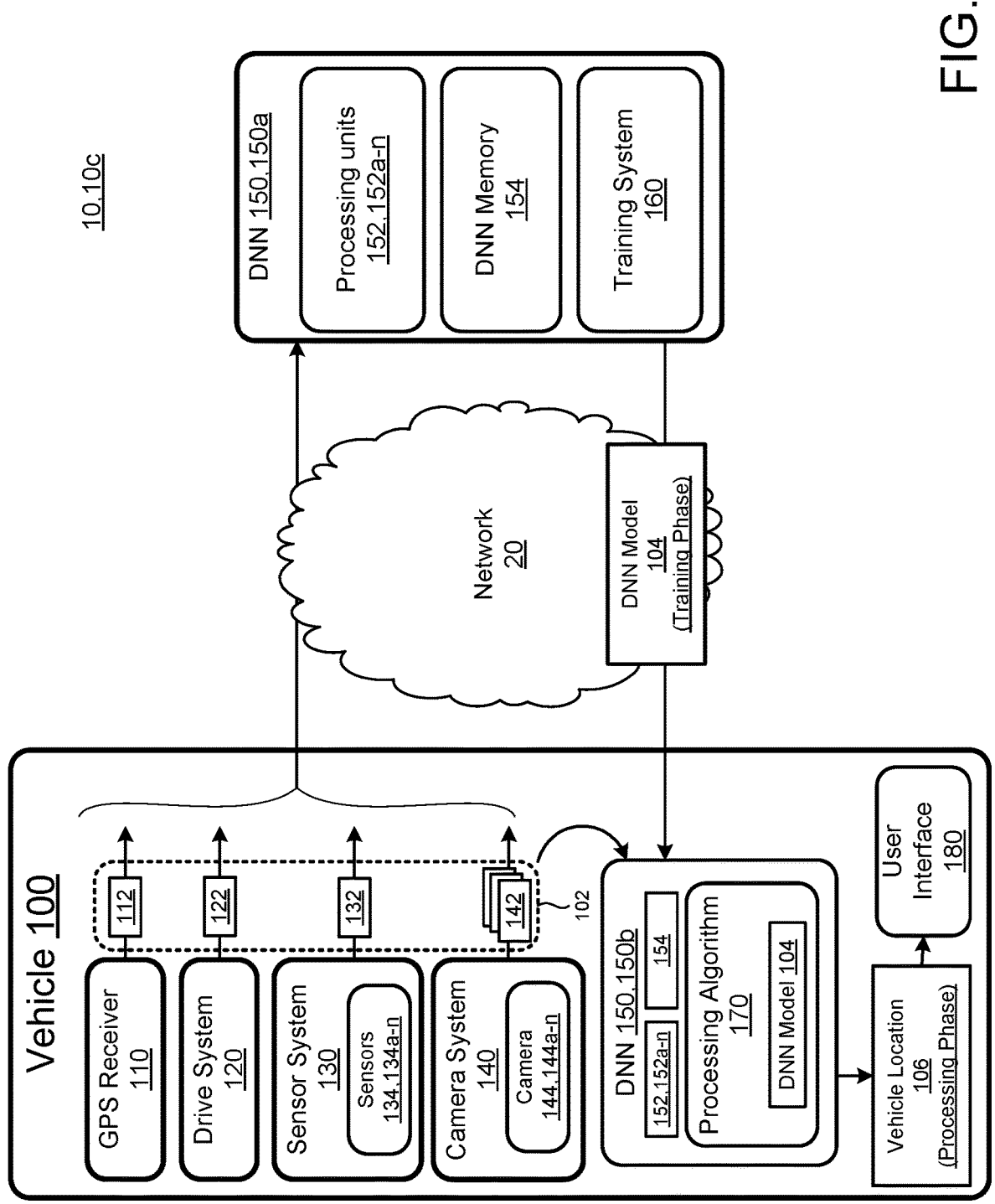
FIG. 1C is a schematic view of exemplary system for determining a vehicle location including a first deep neural network supported by the vehicle and a second deep neural network in communication with the vehicle.

Referring to FIGS. 1A-1C, in some implementations, a vehicle localization system 10, 10a-c includes a vehicle 100 and a deep neural network (DNN) 150. In some examples, as shown in FIG. 1A, the DNN 150 is part of the vehicle 100; while in other examples as shown in FIG. 1B, the DNN 150 is in communication with the vehicle 100. Alternatively, the DNN 150 may include a first DNN 150a and a second DNN 150b, where the first DNN 150 is in communication with the vehicle 100 via a network 20, and the second DNN 150b is part of the vehicle 100. Although the DNN 150 may be part of the vehicle 100 and/or in communication with the vehicle 100, the communication between the vehicle 100 and the DNN 150 is the same in the described systems 10, 10a-c.

In some implementations, the vehicle 100 includes a GPS receiver 110, a drive system 120, a sensor system 130, a camera system 140, and other vehicle systems (not shown). Each one of the systems 110-140 is configured to provide system data 102 to the DNN 150.

The GPS receiver 110 is a device that receives information from one or more GPS satellites (not shown) that are within an unobstructed line-of-sight with the GPS receiver 110. The GPS receiver 110 calculates a location of the vehicle 100 based on the received satellite information, and provides the GPS location data 112 to the DNN 150.

The drive system 120 maneuvers the vehicle 100 across a road surface based on drive commands from a driver of the vehicle 100. The drive system 120 determines vehicle dynamics based on how the driver maneuvers the vehicle 100. The vehicle dynamics, include, but are not limited to, vehicle speed and acceleration, heading angle, and any other information associated with the driver interaction with the vehicle 100. The drive system 120 determines the vehicle dynamics 122 and sends the determined vehicle dynamics 122 to the DNN 150.

The sensor system 130 provides reliable and robust driving by aiding the driver in detecting objects around the vehicle 100, for example. The sensor system 130 may include different types of sensors 134, 134a-n. The sensors 134, 134a-n may include, but are not limited to, RADAR (Radio Detection and Ranging), Sonar (Sound Navigation and Ranging), LIDAR (Light Detection and Ranging, which can entail optical remote sensing that measures properties of scattered light to find range and/or other information of a distant target), LADAR (Laser Detection and Ranging), etc. The sensor system 130 sends sensor data 132 received from the sensors 134, 134a-n to the DNN 150.

The vehicle 100 includes a camera system 140 that includes one or more imaging devices such as cameras 144, 144a-n configured to capture images 142 of the environment of the vehicle 100. The one or more cameras 144, 144a-n may be positioned on a front portion of the vehicle 100, a rear portion of the vehicle 100, and/or side portions of the vehicle 100. Moreover, the cameras 144, 144a-n may be facing upward to capture street signs and street signals and/or downwards to capture adjacent objects and obstacles. The camera system 140 sends the images 142 to the DNN 150.

With reference to FIGS. 1B and 1C, the DNN 150 is in communication with the vehicle 100 by way of a shared network 20. The shared network 20 may include any type of network that allows sending and receiving communication signals, such as a wireless telecommunication network, a cellular telephone network, a time division multiple access (TDMA) network, a code division multiple access (CDMA) network, Global system for mobile communications (GSM), third generation (3G) network, fourth generation (4G) network, a satellite communications network, and other communication networks. The shared network 20 may include one or more of a Wide Area Network (WAN), a Local Area Network (LAN), and a Personal Area Network (PAN). In some examples, the shared network 20 includes a combination of data networks, telecommunication networks, and a combination of data and telecommunication networks. The shared network 20 provides access to cloud computing resources, such as DNN processing units 152 and/or storage resources, such as the DNN memory 154 available over the shared network 20. The term 'cloud' services generally refers to a service performed not locally on the vehicle, but rather delivered from one or more remote devices accessible via one or more networks 20.

In some implementations, the DNN 150 is in communication with the GPS receiver 110, the drive system 120, the sensor system 130, and the camera system 140 within the vehicle 100 as shown in FIG. 1A or via the network 20 as shown in FIG. 1B. In other examples, as shown in FIG. 1C, a first DNN 150, 150a (executing a training system 160) is in communication with the vehicle 100 via the shared network 20; while a second DNN 150, 150b (executing the processing algorithm 170) is part of the vehicle 100.

The DNN 150 receives system data 102 and processes the received system data 102 in one of a training phase (i.e., the training system 160) or a processing phase (i.e., the processing algorithm 170). DNNs 150 are computational approaches used in computer science, among other disciplines, and are based on a large collection of neural unites, loosely imitating the way a biological brain solves problems with large clusters of biological neurons connected by axons. DNNs 150 are self-learning and trained, rather than programed, and excel in areas where the solution feature detection is difficult to express in a traditional computer program.

The DNN 150 includes and is executed on multiple layers of nonlinear processing units 152, 152a-n in communication with DNN non-transitory memory 154. The multiple layers of nonlinear processing units 152 may include one or more graphics processing units (GPUs) that are configured to rapidly manipulate and alter the DNN non-transitory memory 154 to accelerate the creation and processing of images. The DNN non-transitory memory 154 stores instructions that when executed on the nonlinear processing units 152 cause the DNN 150 to execute a training phase or a processing phase. The DNN 150 is configured to execute the training system 160 which results in determining weights and biases referred to as a DNN model 104, which is then used by the processing algorithm 170 to determine a vehicle location 106. In other words, during the training phase, the training system 160 analyses system data 102 received from one or more vehicles 100, and generates a DNN model 104 that includes weights and biases. Once, the training system 160 has determined the DNN model 104, then the processing algorithm 170 receives the DNN model 104 and real-time system data 102 associated with one vehicle 100, then outputs a vehicle location 106 associated with the one vehicle 100.

The DNN 150 may be a convolutional neural network (CNN) and/or a recursive neural network (RNN). A CNN is a class of deep, feed-forwards artificial NN that analyzes visual imagery. RNN is a class of artificial NN where connections between units form a directed cycle. RNN can be used for speech or handwriting recognition among others.

Figure 2:
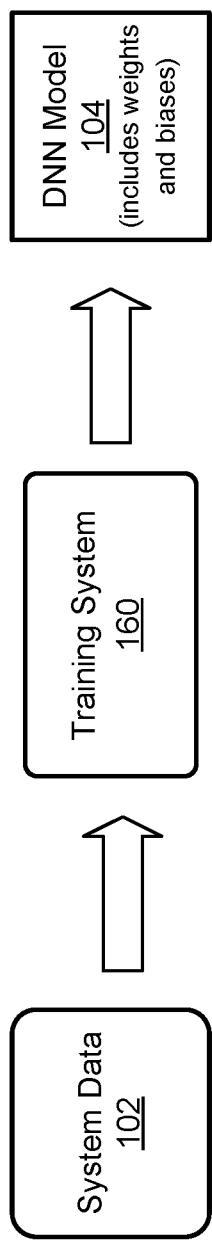
FIG. 2 is a schematic view of an exemplary training phase.
Figure 3:
FIG. 3 is a schematic view of an exemplary processing phase.

Referring to FIG. 2, the training system 160 generates the DNN model 104 based on system data 102 received from one or more vehicles 100. As shown, the training system 160 receives a plurality of system data 102 captured during an extended period of time, analyses the received system data 102, and based on the analysis, the training system 160 determines a DNN model 104 that includes weights and biases. Once the training system 160 determines the DNN model 104, then the training system 160 sends the DNN model 104 to the processing algorithm 170.

As shown, the DNN 150 receives a GPS location data 112 from the GPS receiver 110. The GPS location data 112 is used to give an estimate of the location of the vehicle 100, since relying on the other systems 120-140 only might not be as accurate due to identical scenes in completely different parts of the world. Therefore, the GPS location data 112 aids the DNN 150 in narrowing down the location of the vehicle 100 while the other system data 102 provides more accurate DNN model 104, thus a more accurate vehicle location 106. The DNN 150 needs the vehicle dynamics 122 from the drive system 120 to aid the camera images 142 from the camera system 140 to determine the vehicle location 106. The DNN 150 is capable of processing multiple sensor data (i.e., system data 102) and automatically extracts the most useful information for determining the DNN model 104, and later the vehicle location 106. For example, the DNN 150 automatically filters out moving objects from images taken by the camera system 140 since the vehicle 100 may be at the same position while having different objects around it.

Once the training system 160 receives and analyzes a plurality of system data 102 from one or more vehicles 100 and generates a DNN model 104, then the processing algorithm 170 uses the DNN model 104 to determine a vehicle location 106. The vehicle location 106 may include a DGPS location that is more accurate than a location of the vehicle based only on the GPS location data 112. In some examples, the processing phase is executed while the vehicle 100 is being driven in real-time. Therefore, the processing algorithm 170 provides the vehicle location 106 in real time as the vehicle 100 is moving.

In some implementations, the vehicle includes a user interface 180 in communication with the training system 160 and configured to display the vehicle location 106 to the driver. The user interface may include an instrument panel display (not shown) that is part of an instrument panel of the vehicle 100 or may be separate from the instrument panel, for example, a heads-up-display (HUD) or a display screen supported by a dashboard of the vehicle 100. The display screen may be positioned in a center portion of the dashboard and may be used for displaying images from a rear view camera, displaying maps for navigation, displaying vehicle and/or audiovisual settings. The user interface may be a touch screen that allows the driver to touch the screen for interacting with the user interface 180, while in other examples, the user interface 180 is configured to receive a driver input from one or more sources, such as but not limited to, an input keyboard, a rotary dial, one or more keys on a steering wheel supported by the dashboard.

FIG. 4 shows an exemplary arrangement of operations for a method 400 that determines a vehicle location 106, according to FIGS. 1A-3. At block 402, the method 400 includes receiving, at data processing hardware 152, 152a-n, a first set of vehicle system data 102 from one or more vehicles 100. The data processing hardware 152, 152a-n in communication with memory hardware 154. In some examples, the data processing hardware 152, 152a-n is part of a DNN 150. At block 404, the method 400 includes determining, using the data processing hardware 152, 152a-n, a data model 104 (e.g., DNN model) based on the first set of vehicle system data 102. At block 406, the method 400 includes receiving, at the data processing hardware 152, 152a-n, a second set of vehicle system data 102 associated with the vehicle 100. The vehicle 100 being different than the one or more vehicles 100. At block 408, the method 400 includes determining, using the data processing hardware 152, 152a-n, a vehicle location 106 based on the second set of vehicle system data 102 and the data model 104. At block 410, the method 400 includes displaying, on a user interface 180 of the vehicle 100 in communication with the data processing hardware 152, 152a-n, the vehicle location 106.

In some implementations, the data model 104 includes weights and biases associated with the first set of vehicle system data 102. The data processing hardware 152, 152a-n may be in communication with the vehicle 100 by way of a shared network 20, as shown in FIG. 1B. In other examples, the data processing hardware 152, 152a-n includes a first data processing hardware 150b supported by the vehicle 100 and a second data processing hardware 150a in communication with the first data processing hardware 150b by way of a shared network 20, as shown in FIG. 1C.

In some examples, the first and second sets of vehicle system data include a GPS location data 112, vehicle dynamics 122, sensor data 132, and camera images 142. The first set of vehicle system data 102 is associated with one or more vehicles captured during a predetermined period of time; while the second set of vehicle system data 102 is received in real-time while the vehicle 100 is maneuvering along a road.

Various implementations of the systems and techniques described here can be realized in digital electronic circuitry, integrated circuitry, specially designed ASICs (application specific integrated circuits), FPGA (field programmable gate array), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for determining a location of a vehicle, the method comprising:
   providing a data processing hardware, the data processing hardware comprising a trained neural network having a plurality of layers of nonlinear processing units, and memory hardware in communication with the data processing hardware, the memory hardware storing instructions of a processing algorithm;
   executing, by the nonlinear processing units in a processing phase, the instructions of the processing algorithm to cause the nonlinear processing units to perform:
      receiving, at the data processing hardware, a current vehicle system data associated with the vehicle, the vehicle being different than the training vehicles vehicle, the current set of vehicle system data including GPS location data, vehicle dynamics and image data generated by sensors or cameras mounted to the vehicle;
      receiving a trained neural network model, the trained neural network model being part of the trained neural network and being based upon a training set of vehicle data comprising GPS location data, vehicle dynamics and sensor data associated with one or more vehicles during a training phase, the trained neural network model comprising weights and biases associated with the training set of vehicle data;
      determining, using the data processing hardware, a vehicle location based on the current set of vehicle system data and the trained neural network model; and
      transmitting, from the data processing hardware to a user interface of the vehicle in communication with the data processing hardware, a command to display the vehicle location.

2. The method of claim 1, wherein the data processing hardware is supported by the vehicle.

3. The method of claim 1, wherein the data processing hardware is in communication with the vehicle by way of a shared network.

4. The method of claim 1, wherein the data processing hardware includes a first data processing hardware supported by the vehicle and a second data processing hardware in communication with the first data processing hardware by way of a shared network.

5. The method of claim 1, wherein the training set of vehicle system data is associated with one or more vehicles captured during a predetermined period of time.

6. The method of claim 1, wherein the current set of vehicle system data is received in real-time while the vehicle is maneuvering along a road.

7. A system for determining a location of a vehicle, the system comprising:
   data processing hardware in communication with the user display, the data processing hardware comprising a trained neural network having a plurality of layers of nonlinear processing units;
   memory hardware in communication with the data processing hardware, the memory hardware storing instructions of a processing algorithm that when executed by the nonlinear processing units in a processing phase cause the nonlinear processing units to execute a method, the method including:
      receiving a current set of vehicle system data associated with the vehicle, the current set of vehicle system data including GPS location data, vehicle dynamics and image data generated by sensors or cameras mounted to the vehicle;
      receiving a trained neural network model, the trained neural network model being part of the trained neural network and being based upon a training set of vehicle data comprising GPS location data, vehicle dynamics and sensor data associated with one or more vehicles during a training phase, the trained neural network model comprising weights and biases associated with the training set of vehicle data;
      determining a vehicle location based on the current set of vehicle system data and the trained neural network model; and
   transmitting to a user interface of the vehicle a command to display the vehicle location.

8. The system of claim 7, wherein the data processing hardware is supported by the vehicle.

9. The system of claim 7, wherein the data processing hardware is in communication with the vehicle by way of a shared network.

10. The system of claim 7, wherein the data processing hardware includes a first data processing hardware supported by the vehicle and a second data processing hardware in communication with the first data processing hardware by way of a shared network.

11. The system of claim 7, wherein the training set of vehicle system data is associated with training vehicles captured during a predetermined period of time.

12. The system of claim 7, wherein the current set of vehicle system data is received in real-time while the vehicle is maneuvering along a road.

* * * * *